United States Patent [19]

de Wild et al.

[11] Patent Number: 4,612,689

[45] Date of Patent: Sep. 23, 1986

[54] METHOD OF MANUFACTURING MULTILAYER CAPACITORS

[75] Inventors: Willem R. de Wild; Gijsbertus de With; Henricus C. Smulders, all of Eindhoven, Netherlands

[73] Assignee: U.S. Philips Corporation, New York, N.Y.

[21] Appl. No.: 656,219

[22] Filed: Oct. 1, 1984

[30] Foreign Application Priority Data

Oct. 7, 1983 [NL] Netherlands ............... 8303447

[51] Int. Cl.⁴ .................................. H01G 7/00
[52] U.S. Cl. ........................ 29/25.42; 156/89; 361/321
[58] Field of Search .......... 29/25.42; 156/89; 361/321

[56] References Cited

U.S. PATENT DOCUMENTS 3,179,545  4/1965  Bowers ........................ 156/89
3,456,313  7/1969  Rodriguez et al. ......... 29/25.41
4,008,514  2/1977  Elderbaum ................. 29/25.42

Primary Examiner—Howard N. Goldberg
Assistant Examiner—P. W. Echols
Attorney, Agent, or Firm—Norman N. Spain

[57] ABSTRACT

A method of manufacturing multilayer ceramic capacitors characterized by the following steps:
forming dielectric foils comprising a mixture of an organic binder with an oxidic ceramic powder;
stacking these foils alternately with layers of electrically conductive material which function as electrodes;
heating the stack to a previously determined temperature below the atmospheric pressure sintering temperature of the oxidic ceramic powder while simultaneously applying a uniaxial pressure in the direction of stacking to form a unit;
releasing the pressure and cooling; and
severing the unit into individual capacitor bodies.

6 Claims, 3 Drawing Figures

METHOD OF MANUFACTURING MULTILAYER CAPACITORS

The invention relates to a method of manufacturing multilayer capacitors composed of alternate layers of a dielectric oxidic ceramic material and an electrode material which have been formed into an integral body as a result of the application of pressure at an elevated temperature.

Multilayer capacitors of the above-described type having a construction of alternate layers of electrode metal and of ceramic dielectric material (so-called monolithic ceramic capacitors) have so far been manufactured generally on an industrial scale as follows.

A moulding mass of finely ground oxidic ceramic dielectric power mixed with a binder is deposited in thin layers which are dried to form foils and are then provided with electrodes by means of a metal paste provided on them by silk-screening. Said foils are stacked and compressed and severed into individual capacitor bodies. Said capacitor bodies, dependent on the composition of the ceramic dielectric material, are sintered at temperatures between 1200° and 1400° C. During sintering the ceramic dielectric powder shrinks to form a dense polycrystalline structure having a higher density than the initial density of the ceramic layers. At the same time the powder particles of metal are sintered to form electrode layers of metal which form a coherent assembly with the dielectric layers. However, an upper limit is imposed upon the capacitance of the monolithic ceramic capacitors manufactured in this manner. When capacitors are to be manufactured having higher capacitance values per unit volume, it appears that the dielectric layers cannot be made sufficiently thin (in particular not thinner than approximately 25 $\mu$m) and not sufficiently dense by means of the conventional sintering technique. The difference in sintering behaviour between electrode material and dielectric material presents a problem. This results in the layers locally detaching from each other (delamination), porosity and crack-formation.

As an alternative method it has been suggested to increase the density of the capacitor bodies (the so-called green products) by means of an isostatic hot pressing process. In the isostatic hot pressing process, the medium to transfer the pressure may be either a gas, or a ceramic powder in which the products to be hot pressed are embedded. The former method (see Bull. Amer. Ceram. Soc. 54, February 1975, pp. 201–7: K. H. Härdtl, "Gas isostatic hot pressing without molds") has for its disadvantage that the article to be hot pressed either has to be packed in a gas-tight envelope (canning), or must already have a closed porosity as a result of which it is necessary that it is first subjected to a sintering process without pressure. Apart from the fact that this is uneconomic, it again brings in a few of the disadvantages associated with the normal sintering process. The second method (see Proc. 21st Electric Components Conference, Washington DC, 1971, pp. 324–327: G. H. Rodriquez, "Hot pressed monolith capacitors") has for its disadvantage that the ceramic powder in which the capacitor bodies are embedded and which is to transfer the pressure does not do this sufficiently uniformly in that its own density increases. The result is that the reject percentape of the resulting capacitors is high (approximately 50%). Moreover it is uneconomic that after termination of the sintering process, the separate capacitor bodies have to be separated from the powder.

It is an object of the present invention to provide an economical method of manufacturing multilayer capacitors which overcomes the disadvantages mentioned hereinbefore and which leads to multilayer capacitors having increased capacitance values and a high quality.

According to the invention there is provided a method of manufacturing multilayer capacitors which is characterized by the following steps:

forming dielectric foils comprising a mixture of an organic binder with an oxidic ceramic powder;

stacking said foils alternately with layers of electrically conductive material which function as electrodes;

pressure-sintering the stack by heating the resultant stack to a previously determined temperature below the atmospheric pressure sintering temperature of the oxidic ceramic powder while simultaneously applying a uniaxial pressure in the direction of stacking so as to form a unit;

releasing the pressure and cooling; and severing the unit into separate capacitor bodies.

An important aspect of the method according to the invention is that a high pressure, in particular between 0.2 and 5 kbar can be applied to the stack. Herewith on the one hand the disadvantages of the gas pressure method (gas-tight envelope necessary) are avoided while on the other hand it was surprisingly found that more homogeneously compressed capacitor bodies are obtained from the stacked foils in the manner described than in the case in which individual capacitor bodies are embedded entirely in powder.

In the method according to the invention, the stack is preferably compressed (laminated) prior to sintering at a temperature between 50° and 100° C. under a pressure between 0.5 and 5 kbar. The advantage of this is that the foil stack can be placed between the dies of the compression device as a cohering packet or wafer.

Afer the lamination process the organic binder can be fired during a separate step. An advantageous preferred embodiment of the method in accordance with the invention, however, is characterized in that the organic binder is fired from the foils during the heating to the previously determined (pressure-sintering) temperature.

After the uniaxial pressure-sintering process, the resulting compact unit is severed into individual capacitor chips. In the above-mentioned (pseudo)isostatic hot pressing process, the use of wafers is not possible because embedding the wafers in a powder bed does not ensure a uniform pressure distribution. As a result of the non-uniform pressure distribution, much crack formation occurs in the wafers during the isostatic hot pressing of wafers embedded in a powder.

An important aspect ot the method in accordance with the invention not mentioned hereinbefore is, that the comparatively large uniaxial pressure which is exerted is the reason why no cavities can be formed between the layers during the sintering process. As a result of this, delamination (the phenomenon that a ceramic layer in some places is not bonded via the electrode layer to the next ceramic layer) is prevented. Delamination gives loss of quality; it makes multilayer capacitors unreliable.

In this connection it should be noted that the manufacture of multilayer capacitors with simultaneous application of pressure and temperature is known per se from GB Patent Specification No. 1,272,490. In this specification however, the method starts from a stack of dielectric foils formed from glass frit and containing 20% of an organic binder. Metal films are provided on said foils. During the heating treatment (to approximately 725' C.), the binder fired and the glass frit softens. A low pressure (a few tens of bars) is exerted on the stack by means of dies so as to keep the foils positioned with respect to each other. The softened visco-elastic glass frit is fused to the metal films at this low pressure, and after raising the temperature the glass mass crystallizes. Glass ceramic dielectric layers are formed having a (comparatively low) dielectric constant of approximately 1250. In this case it does not relate to pressure-sintering at a comparatively high pressure of a stack of ceramic layers alternately and metallic layers to form one (monolithic) unit.

An embodiment of the invention will be described in greater detail with reference to the drawing, in which:

FIG. 1 diagrammatically shows a pressure-sintering system,

Figure 1:
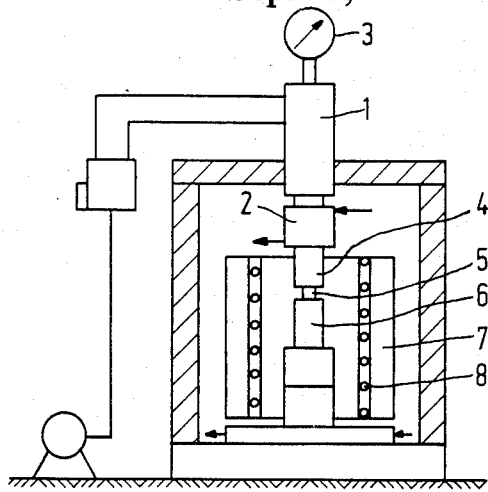

A pressure-sintering system as shown in FIG. 1 may be used for carrying out a method according to the invention. In principle this is a pressure system consisting of a hydraulic press 1 having a cylinder 2 with a water-cooled head.

The range of pressures which are useful for the invention is between 200 bar and 5 kbar. The pressure can be read on a manometer 3. The pressure is transferred via an upper die 4 of refractory material (i.e. capable of withstanding high temperatures) for example, $Al_2O_3$ or SiC.

A packet 5 to be compressed (see also FIG. 2) is placed on a lower die 6, also of a refractory material. It is ensured that the die surfaces which exert the pressure on the packet are as accurately parallel as possible. The dies 4,6 are accommodated in a tube furnace 7 having a heating coil 8. The inner tube of the tube furnace is of a ceramic material. The hydraulic system 1,2 provides the possibility of controlling the pressure build-up, while the closed envelope provides the possibility of operating under different gas conditions. For the manufacture of dielectric ceramic foils, for example, a lightly doped barium titanate is used, preferably having such a particle size that the grain size after pressure-sintering is smaller than 1 μm.

Figure 2:
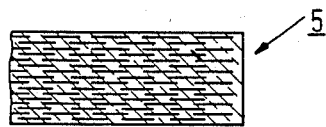
FIG. 2 shows a packet to be subjected to a pressure-sintering process.

By means of a (lightly doped) barium titanate powder comprising 1.2% by weight of $Nb_2O_5$ and 0.3% by weight of $Co_3O_4$, a dielectric constant $E_r$ of 3,000 can be realized and a capacitor can be obtained having a temperature coefficient of the capacitance $Td=(C_T-C_{25})/C_{25}\times 100\%$ which is smaller than 15% in the temperature range from $-55°$ to $125°$ C. This capacitor satisfies the so-called X7R specification. The powder is mixed with an organic binder (for example, polyvinyl alcohol). Sheets which are a few tens of microns thick, in particular 20–50 μm, are drawn from the moulding mass thus obtained. After drying, foils are cut from these sheets to the correct size. Patterns of electrode material comprising a metallic powder in a binder are provided on the foils by means of silk-screening. As shown in FIG. 2, the respective sheets are stacked to form a packet 5 in which in each ultimate capacitor body the electrode patterns 9,10 continue alternately to one side and to the opposite side so that every two adjacent electrode patterns overlap each other partly. In order to obtain a good bonding of the layers, the packet 5 is first laminated by subjecting it to a comparatively high pressure (for example 3 kbar) at a comparatively low temperature (for example 70°–80° C.) The binder is then removed frm the foils by firing. In the conventional sintering process of manufacturing ceramic multilayer capacitors, firing of the binder is carried out separately after the packets have been severed into individual capacitor bodies.

In the method according to the invention the firing of the binder may advantageously take place in the pressure-sintering apparatus during the heating of the complete packets to the peak temperature. The packet 5 which is to be subjected to a pressure-sintering process is placed between the dies 4,6 of the pressure system having an anti-adhesion layer between the dies and the upper and lower sides, respectively, of the packet, which prevents the packet from adhering to the die surfaces during the sintering process. $ZrO_2$ powder and boron nitride, for example, are particularly useful for this purpose.

Heating the furnace 7, with the packet 5 placed therein, to the pressure-sintering temperature takes place, for example, in 90 minutes. Depending on the composition of the oxidic ceramic dielectric material, the pressure-sintering temperature may be between approximately 900° and 1200° C. This means that the pressure-sintering temperatures are approximately 200 Celsius degrees lower than the normal sintering temperatures. When the pressure-sintering temperature has been reached, the uniaxial pressure is applied. In the present experiments the pressure-sintering temperature was approximately 1080° C. when the pressure was approximately 500 bar. Dependent on the adjusted temperature and pressure, a sintering time of approximately 120 minutes may be necessary. The assembly is then cooled to room temperature.

Figure 3:
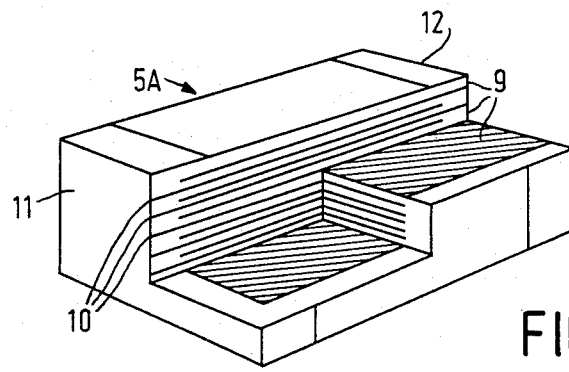
FIG. 3 is an elevation partly broken away of a multilayer ceramic capacitor.

The integral body obtained after pressure-sintering and cooling to room temperature is sawn into pieces so as to obtain individual ceramic capacitor chips. On each chip 5A (see FIG. 3) the sides 11,12 at which the respective electrodes 10,9 terminate are metallized so as to form head contacts. The resulting capacitors had the following properties:

| Dimension | N | n | d (μm) | C (nF) | Tan δ ($10^{-4}$) | $R_{iso}$ ($10^4$ MΩ) | $V_o$ (V) |
|---|---|---|---|---|---|---|---|
| 1210 | 34 | 50 | 17 | 230 | 157 | 2 | 630 |
| 1812 | 70 | 50 | 17 | 900 | 160 | 1 | 580 |

In this table:
N: number of dielectric layers
n: number of samples
d: thickness of dielectric
C: capacitance
Tan δ: loss factor (tangent of the loss angle)
$R_{iso}$: insulation resistance
$V_o$: breakdown voltage It is to be noted that the uniaxial pressure-sintered samples have a higher capacitance value than isostatically hot pressed samples. This difference is to be ascribed mainly to geometric factors. The isostatic hot pressing takes place omnilaterally. This means that both the electrode surface and the mutual distance between the electrodes are reduced. In the uniaxial pressure-sintering process, no surface reduction takes place because the ceramic material sinters only in the direction of the applied pressure. As a result of this the sintering shrinkage is expressed in the reduction of the electrode spacing only. Hence if one of two identical green products is uniaxially pressure-sintered and the other one is isostatically hot pressed, the former may have a capacitance which is approximately twice as large as that of the latter.

If dielectric layers having a thickness of 17 μm are not used, as the above example, but have a smaller thickness, multilayer ceramic capacitors having capacitance values up to the 1 μF region can be realized within the 1812 size by means of the method in accordance with the invention. As a matter of fact the method according to the invention enables the formation of a stack of a large number of these layers to form a compact unit.

If barium titante is used as a ceramic dielectric material, which material must be sintered in an oxidizing atmosphere, the method according to the invention enables Ag-Pd to be used as an electrode material instead of Pd. This means an important price advantage.

Thus the method according to the invention results in multilayer ceramic capacitors being obtained having dielectric layers in a thickness of at most 20 μm which are substantially free from pores (density>99% of the theoretical density). So far this result could not be realized with other methods.

What is claimed is:

1. A method of manufacturing multilayer capacitors composed of alternate layers of a dielectric oxidic ceramic material and of an electrode material which have been formed into an integral body as a result of the application of pressure at an elevated temperature, characterized by the following steps: forming dielectric foils comprising a mixture of a organic binder with an oxidic ceramic powder;
   stacking said foils alternately with layers of electrically conductive material which function as electrodes;
   pressure-sintering the stack by heating the stack to a previously determined temperature below the atmospheric pressure sintering temperature of the oxidic ceramic powder while simultaneously applying a uniaxial pressure in the direction of stacking so as to form an integral body;
   releasing the pressure and cooling; and
   severing the unit into individual capacitor bodies.

2. A method as claimed in claim 1, characterized in that, prior to sintering, the stack is laminated at a temperature between 50° and 100° C. under a pressure between 0.5 and 5 kbar.

3. A method as claimed in claim 1, characterized in that the sintering temperature is between 900° C. and 1200° C.

4. A method as claimed in claim 3, characterized in that, depending upon the sintering temperature, the uniaxial pressure is between 200 bar and 5 kbar.

5. A method as claimed in claim 1, characterized in that the largest dimension in the plane of the foils is at least ten times larger that the height of the stack.

6. A method as claimed in claim 1, characterized in the organic binder is fired from the mixture during the heating to the previously determined temperature.

* * * * *